United States Patent
Leuthold

(10) Patent No.: US 9,181,978 B2
(45) Date of Patent: Nov. 10, 2015

(54) GROOVED THRUST BEARING

(71) Applicant: Seagate Technology LLC, Cupertino, CA (US)

(72) Inventor: Hans Leuthold, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 38 days.

(21) Appl. No.: 13/860,169

(22) Filed: Apr. 10, 2013

(65) Prior Publication Data

US 2014/0307989 A1      Oct. 16, 2014

(51) Int. Cl.
*F16C 17/04* (2006.01)
*F16C 32/06* (2006.01)
*G11B 5/596* (2006.01)
*G11B 19/20* (2006.01)

(52) U.S. Cl.
CPC ........... *F16C 17/045* (2013.01); *F16C 32/0614* (2013.01); *F16C 32/0685* (2013.01); *G11B 5/59638* (2013.01); *G11B 19/2036* (2013.01); *F16C 2370/12* (2013.01)

(58) Field of Classification Search
CPC .... F16C 17/045; F16C 19/38; F16C 33/0614; F16C 33/0692; F16C 33/107
USPC ................. 384/105, 109, 112, 113, 121, 123; 29/898.041
See application file for complete search history.

(56) References Cited

U.S. PATENT DOCUMENTS

| | | | |
|---|---|---|---|
| 4,236,299 A | 12/1980 | Denner et al. | |
| 4,523,800 A | 6/1985 | Kamiya et al. | |
| 4,538,081 A | 8/1985 | Kamiya et al. | |
| 4,551,032 A | 11/1985 | Mottershead | |
| 5,127,744 A | 7/1992 | White et al. | |
| 5,168,186 A | 12/1992 | Yashiro | |
| 5,433,529 A * | 7/1995 | Hensel | 384/123 |
| 5,558,443 A * | 9/1996 | Zang | 384/112 |
| 5,660,480 A | 8/1997 | Fujii et al. | |
| 5,770,906 A * | 6/1998 | Hazelton et al. | 384/112 |
| 5,988,886 A * | 11/1999 | Takahashi | 384/112 |
| 6,019,515 A | 2/2000 | Fujii et al. | |
| 6,066,903 A | 5/2000 | Ichiyama | |
| 6,071,014 A * | 6/2000 | Lee et al. | 384/107 |
| 6,126,320 A * | 10/2000 | Ichiyama | 384/112 |
| 6,246,136 B1 | 6/2001 | Ichiyama | |
| 6,292,328 B1 * | 9/2001 | Rahman et al. | 360/99.08 |
| 6,508,590 B2 | 1/2003 | Kusunoki | |
| 6,554,473 B2 * | 4/2003 | Takahashi | 384/107 |
| 6,581,857 B2 | 6/2003 | Fujii et al. | |
| 6,674,201 B2 | 1/2004 | Liu et al. | |
| 6,760,187 B2 * | 7/2004 | Asada et al. | 360/99.08 |
| 6,949,852 B2 * | 9/2005 | Aiello | 310/90 |
| 7,133,250 B2 | 11/2006 | Herndon et al. | |

(Continued)

FOREIGN PATENT DOCUMENTS

JP    06147225 A  *  5/1994

*Primary Examiner* — Marcus Charles

(57) ABSTRACT

Provided herein is an apparatus, including an inner component, wherein the inner component includes a thrust plate; an outer component, wherein the inner component and the outer component are positioned for relative rotation, and wherein the inner component and the outer component are positioned to form at least one bearing having a groove pattern that imparts a predetermined direction to the rotational motion of the inner component and the outer component; and a gas inlet operable to receive a pressurized gas.

10 Claims, 3 Drawing Sheets

(56) References Cited

U.S. PATENT DOCUMENTS

| | | | |
|---|---|---|---|
| 7,196,868 B2* | 3/2007 | Asada et al. | 360/98.07 |
| 7,294,946 B2* | 11/2007 | Jyono et al. | 384/132 |
| 7,407,327 B2 | 8/2008 | Le et al. | |
| 7,568,839 B2* | 8/2009 | Gotoh et al. | 384/107 |
| 7,572,059 B2* | 8/2009 | Lim | 384/100 |
| 7,619,339 B2* | 11/2009 | Hendriks | 384/120 |
| 8,162,544 B2 | 4/2012 | Hirata | |
| 2005/0069232 A1* | 3/2005 | Aiello et al. | 384/100 |

* cited by examiner

GROOVED THRUST BEARING

BACKGROUND

Conventional, externally pressurized, air bearing spindles are designed such that the spindle rotation is bidirectional, allowing a motor to rotate the spindle in either a clockwise direction or a counterclockwise direction. This bi-directionality allows for these conventional, externally pressurized, air bearing spindles to be used in a wide variety of applications, some of which utilize clockwise spindle rotation, some of which utilize counterclockwise spindle rotation, and some of which alternately utilize clockwise and counterclockwise spindle rotation. Some applications such as servo track writing on raw media for hard disk drives ("HDD") are affected by spindle performance.

SUMMARY

Provided herein is an apparatus, including an inner component, wherein the inner component includes a thrust plate; an outer component, wherein the inner component and the outer component are positioned for relative rotation, and wherein the inner component and the outer component are positioned to form at least one bearing having a groove pattern that imparts a predetermined direction to the rotational motion of the inner component and the outer component; and a gas inlet operable to receive a pressurized gas.

These and other features and aspects of the invention may be better understood with reference to the following drawings, description, and appended claims.

DRAWINGS

Figure 1:
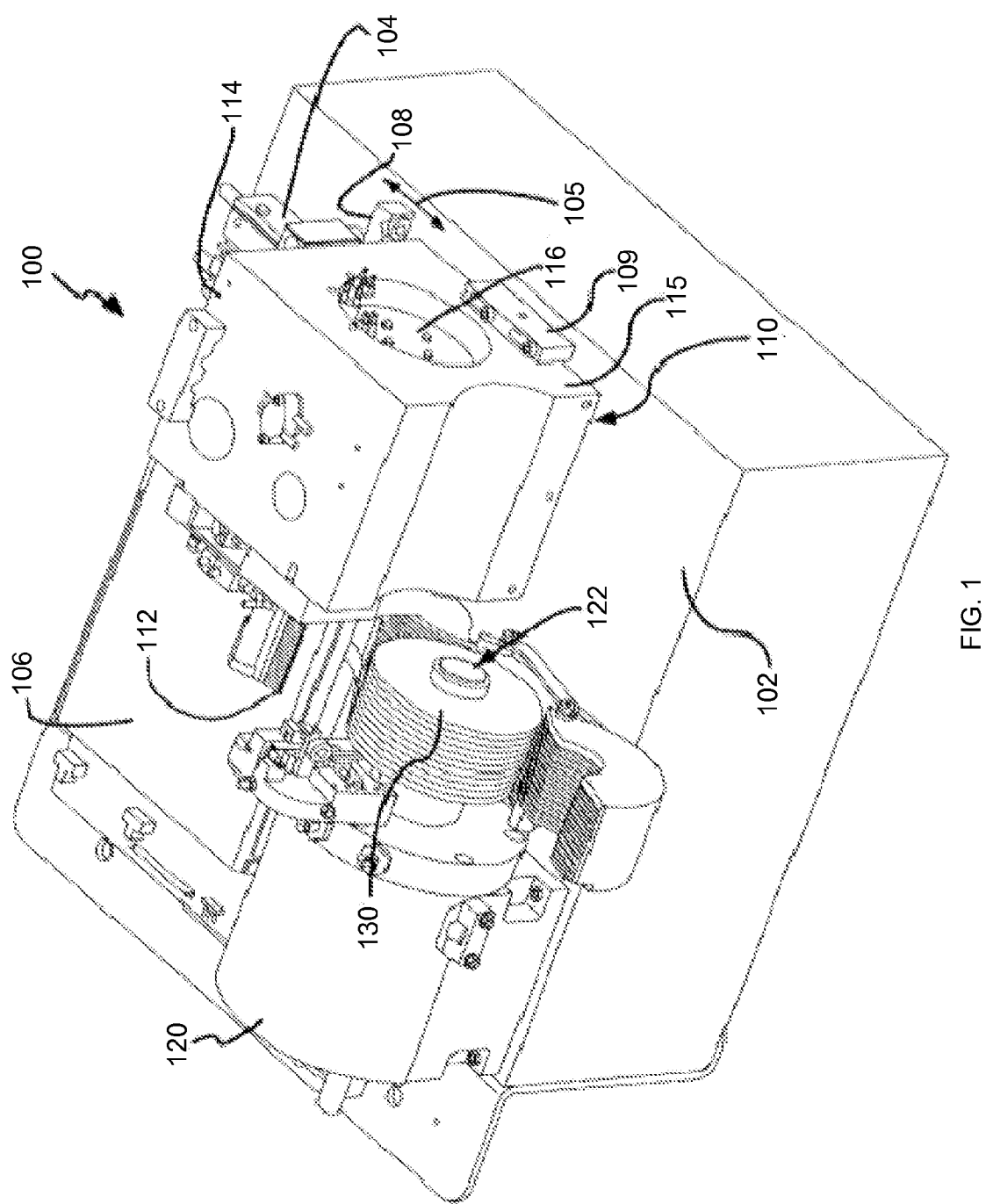

FIG. 1 provides a schematic of a multi-disk servo track writer incorporating a gas bearing spindle, according to an embodiment.

Figure 2:
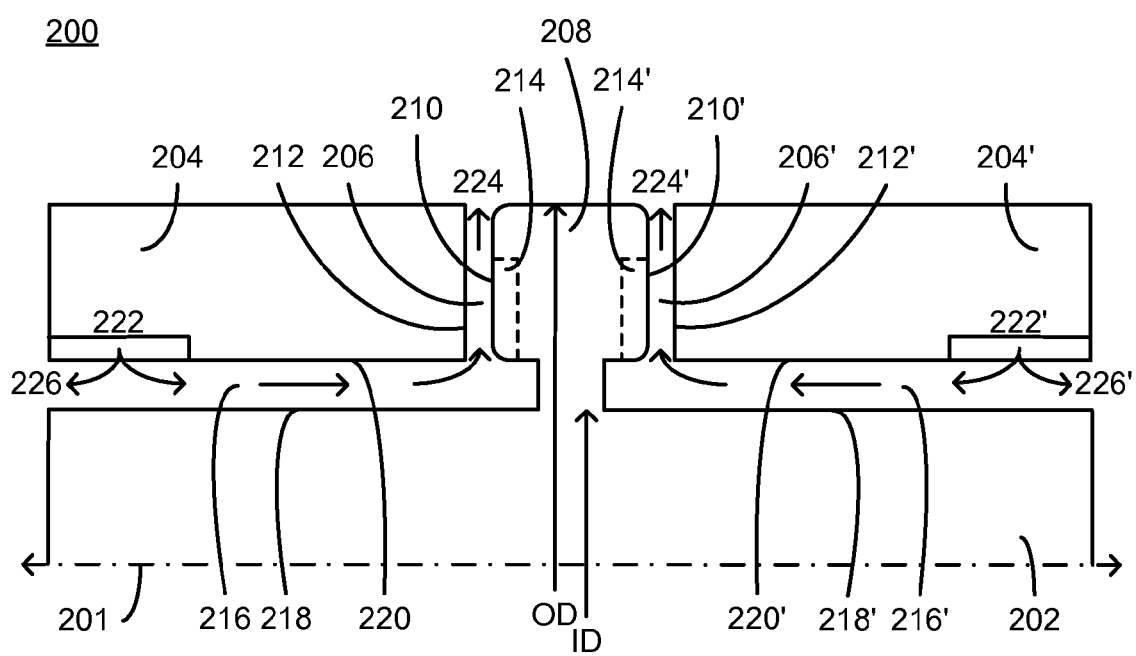

FIG. 2 provides a schematic of a cross section of half a gas bearing spindle in a region of interest, according to an embodiment.

Figure 3A:
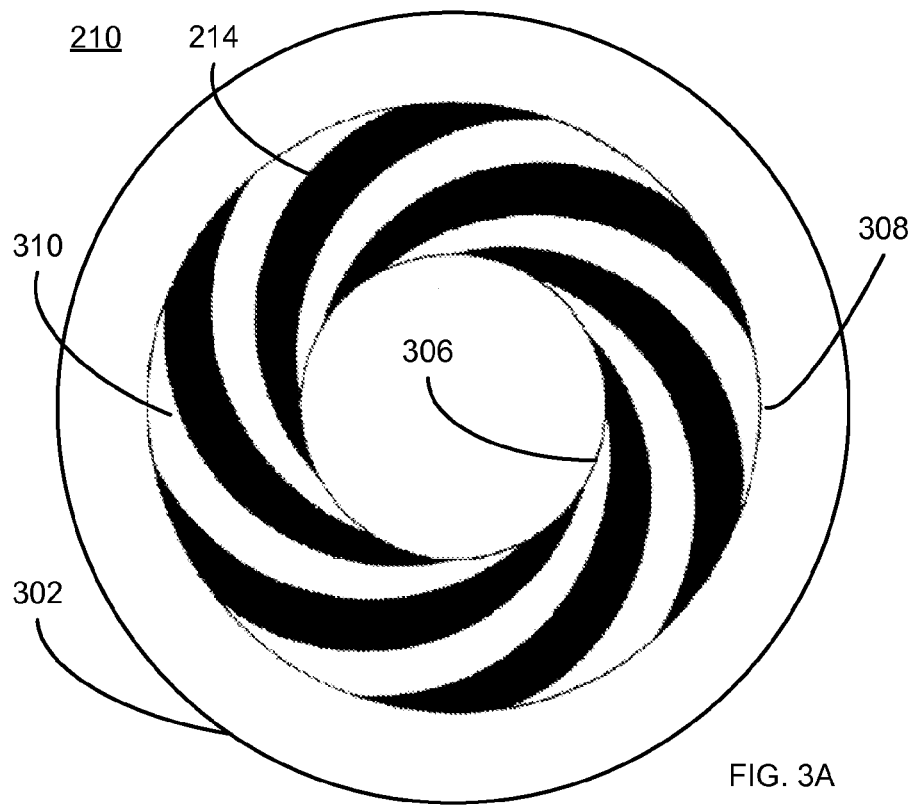
Figure 3B:
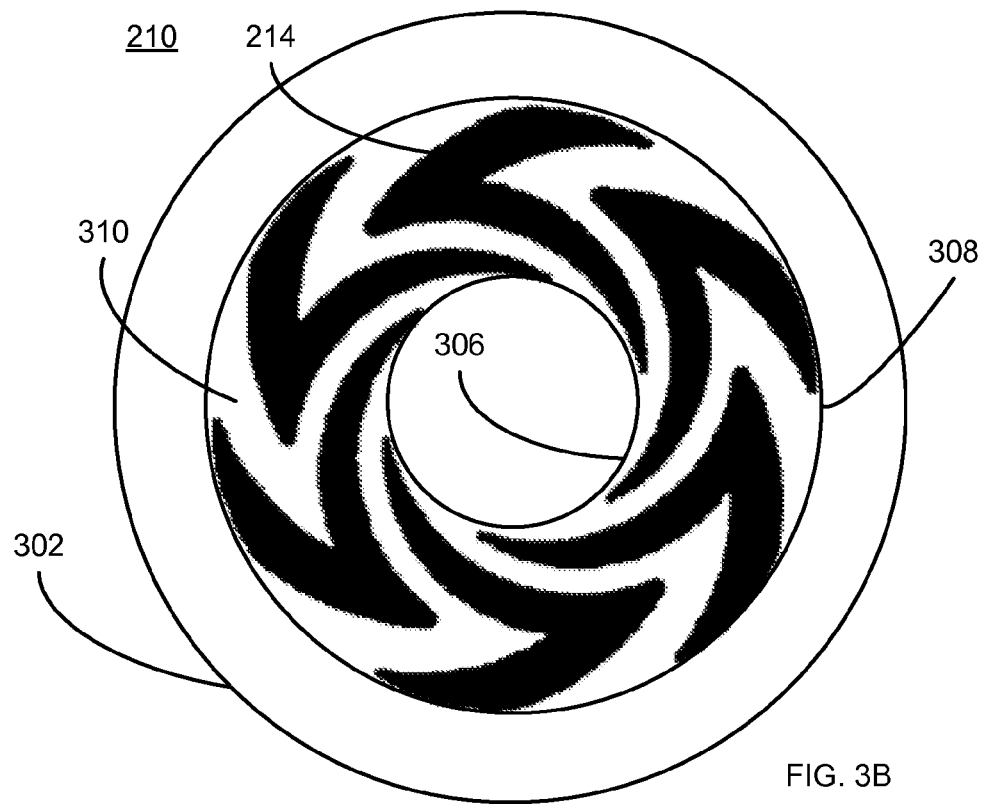

FIG. 3A and FIG. 3B provide schematics of thrust surfaces of thrust plates for gas bearing spindles, according to two embodiments.

DESCRIPTION

Before embodiments of the invention are described in greater detail, it should be understood by persons having ordinary skill in the art to which the invention pertains that the invention is not limited to the particular embodiments described and/or illustrated herein, as elements in such embodiments may vary.

It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art to which the invention pertains that the terminology used herein is for the purpose of describing embodiments of the invention, and the terminology is not intended to be limiting.

Unless indicated otherwise, ordinal numbers (e.g., first, second, third, etc.) are used to distinguish or identify different elements or steps in a group of elements or steps, and do not supply a serial or numerical limitation on the elements or steps of the claimed invention, or embodiments thereof. For example, "first," "second," and "third" elements or steps need not necessarily appear in that order, and the claimed invention, or embodiments thereof, need not necessarily be limited to three elements or steps.

It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the invention pertains.

Embodiments of the invention will now be described in greater detail.

HDDs are data storage devices that store digital data, for example, in magnetic form, typically on a plurality of rigid disks coated with a magnetizable medium. The digital data is stored on the disks in a plurality of concentric circular tracks by means of an array of transducers ("read-write heads") operable to transfer data between the tracks and an external environment.

During HDD write operations, digital data is written onto one or more disk tracks; during HDD read operations, digital data is transferred from one or more disk tracks to the external environment. Important to both operations is the accurate and efficient positioning of each read-write head relative to the center of the disk track being written to or read from. Positioning the read-write head within a disk track may use head-positioning servo tracks (i.e., patterns of data used to maintain optimum track spacing and sector timing).

Head-positioning servo tracks may be recorded onto target disks by servo track writer ("STW") assemblies during HDD manufacturing. For example, servo tracks may be written onto a plurality of disks with a multi-disk servo track writer ("MDW") having dedicated servo-writing heads (see. FIG. 1).

Using a conventional MDW, 16-24 disks may be simultaneously written to, allowing for a relatively high throughput of servo track-ready disks, which disks may subsequently be used for assembling HDDs. An increase in the disk-loading capacity and/or the speed at which servo tracks are written may increase the throughput of a conventional MDW; however, both the disk-loading capacity and the speed at which servo tracks are written are affected by the stability (e.g., stiffness) of the gas bearing spindle on which the disk-containing hub is mounted. The gas bearing spindle described herein below is operable to accommodate an increase in disk-loading capacity and/or an increase in rotational speed.

FIG. 1 provides a schematic of an exemplary MDW fastened to a flat, rigid base or platform 102 (e.g., a granite slab) in which the gas bearing spindle described herein below may be used. The MDW 100 of FIG. 1 includes a spindle motor 120 attached to a spindle motor hub assembly 122 comprising a gas bearing spindle, which spindle motor hub assembly 122 positions the disk pack 130 onto which the servo tracks are simultaneously recorded.

The MDW 100 of FIG. 1 further includes an actuator assembly 110 for moving servo-recording heads 112 for recording servo tracks onto the disks of the disk pack 130. The actuator assembly 110 may include an actuator block 114 housing a rotational air bearing, a translational air bearing, an E-block assembly including an E-block, a series of one or more actuator arms having recording heads 112 thereon, a DC torque, and a motor 116 (e.g., brushless motor) for actuating the rotational air bearing. The actuator assembly 110 may be connected to the platform 102 by means of a slide mechanism 104 for lateral movement of the actuator assembly 110 (indicated by bi-directional arrow 105) over the platform 102 between a servo-recording position and a disk loading/unloading position.

Continuing with FIG. 1, a pair of stops 108 extends along a lower edge of a side face of the actuator block 114 on opposite sides of the actuator block. Each stop of the pair of stops 108 extends beyond the front face and back face 115 of the actuator block 114. A pair of catch blocks 109 is positioned on the platform 102 on opposite sides of the actuator block 114 to contact each stop when the sliding mechanism 104 laterally moves the actuator assembly 110 to the servo-recording position on the platform.

The schematic of the exemplary MDW in FIG. 1 further includes a vacuum chuck 106 that rigidly secures the actuator assembly 110 in a desired position for servo track writing and fastens the spindle motor hub assembly 122 to the spindle motor 120.

In operation of the foregoing MDW, a plurality of disks may be assembled into the disk pack 130 and mounted onto the spindle motor hub assembly 122 comprising the gas bearing spindle. The actuator assembly 110 may then be laterally moved into position for servo track recording. Each disk of the plurality of disks may be simultaneously rotated on the spindle motor head assembly 122 such that each respective servo-recording head of the servo-recording heads 112 on the actuator assembly 110 may record one or more servo tracks. The actuator assembly 110 may then be laterally moved away from the mounted disk pack 130 for disk loading/unloading. The disk pack 130 may then be disassembled into a plurality of servo-track ready disks for use in a HDD.

FIG. 2 provides a schematic of a cross section of half a gas bearing spindle 200 in a region near thrust plate 208. To simplify discussion of the gas bearing spindle 200, focus will be given to one side of the gas bearing spindle 200 with the understanding that, in the embodiment provided in the schematic of FIG. 2, there are two portions of the gas bearing spindle 200, each portion being on opposite sides of the thrust plate 208.

Gas bearing spindle 200 of FIG. 2, having a central axis 201, comprises shaft 202 and sleeve 204, which, in combination, provide a journal bearing 216 having a shaft surface 218 and a sleeve surface 220. Thrust plate 208, which has an outer diameter ("OD") and an inner diameter ("ID") linked to an end of the journal bearing 216, in combination with sleeve portion 204 forms thrust bearing 206. Thrust bearing 206 comprises thrust surface 210 having grooves 214 (see FIG. 3A and/or FIG. 3B for grooves in thrust surface 110) and opposing surface 212.

Gas inlet 222 of FIG. 2 is operable to provide a pressurized gas to the gas bearing spindle 200, which gas may be vented through journal bearing vent 226 and thrust bearing vent 224. Pressurized gas delivered through gas inlet 222 provides a gas cushion for the gas bearing spindle in both aerostatic operation (e.g., loading/unloading operations) and aerodynamic operation (e.g., servo track recording).

The arrows shown in FIG. 2 indicate the movement of the gas provided by gas inlet 222. As shown, some of the gas exits the gas bearing spindle 200 at journal bearing vent 226, while some of the gas travels along journal bearing 216 to thrust bearing 206. While grooves 214 of a grooved section on thrust surface 210 (see FIG. 3A and/or FIG. 3B) function to provide a larger gap between opposing surface 212 and thrust surface 210 (e.g., for aerostatic operation), the grooves 214 also function to provide a localized region of pressure in the thrust bearing 206 (e.g., for aerodynamic operation), which localized region of pressure may be greater than the pressure of the pressurized gas. Without being bound by theory, such a localized region of pressure may, through backpressure, effectively direct gas back toward an inner diameter of thrust plate 208 and/or into journal bearing 216.

Continuing with FIG. 2, the gas directed back into the journal bearing 216 functions to increase axial stiffness of the gas bearing spindle, which axial stiffness defines flying height, and angular stiffness of the gas bearing spindle, so the shaft 202 remains in place. Axial and angular stiffness is a function of rotational speed and is the effect of modifying the pressure profile of the journal bearing 216. With respect to angular stiffness, for example, an increase in gas flow through journal bearing vent 226 results in an increased stiffness at the end of the journal bearing 216 comprising the journal bearing vent 226.

While the grooves 214 on thrust surface 210 function to provide a localized region of pressure in the thrust bearing 206, gas may still flow through thrust bearing 206 as shown in FIG. 2 by way of thrust bearing vent 224, though such flow may be reduced in comparison to a conventional, aerostatic, gas bearing spindle having a thrust plate with radial grooves (i.e., grooves coincident with radii) in its surface.

FIG. 3A provides a schematic of a thrust surface 210 of a thrust plate 208 for a gas bearing spindle 200. Thrust surface 210 of FIG. 3A provides a non-grooved or flat section as well as the grooved section. Between the outer diameter of the thrust plate 302 and an outer diameter of the grooved section 308 is the non-grooved or flat section of the thrust surface 210. The function of such a non-grooved or flat section is to provide an aerostatic effect when the shaft 202 and the sleeve 204 of gas bearing spindle are not in relative rotation. With respect to the grooved section, the function of such a grooved section is to provide an aerodynamic effect when the shaft 202 and the sleeve 204 of gas bearing spindle are in relative rotation.

As shown in FIG. 3A, grooves 214 and lands 310 of the grooved section are arranged in a spiral pattern in thrust surface 210. The spiral pattern originates at an inner diameter of the grooved section 306 and extends to the outer diameter of the grooved section 308. Such a spiral pattern of grooves 214 imparts a predetermined direction to the rotational motion of the shaft 202 within the sleeve 204. Each thrust surface (i.e., thrust surface 210 and thrust surface 210' of thrust plate 208 in FIG. 2) may have the same or a different groove pattern provided that the predetermined direction to the rotational motion of the shaft 202 within the sleeve 204 is maintained.

FIG. 3B provides a schematic of a thrust surface 210 of a thrust plate 208 for a gas bearing spindle 200. Thrust surface 210 of FIG. 3B provides a non-grooved or flat section as well as the grooved section. Between the outer diameter of the thrust plate 302 and an outer diameter of the grooved section 308 is the non-grooved or flat section of the thrust surface 210. The function of such a non-grooved or flat section is to provide an aerostatic effect when the shaft 202 and the sleeve 204 of gas bearing spindle are not in relative rotation. With respect to the grooved section, the function of such a grooved section is to provide an aerodynamic effect when the shaft 202 and the sleeve 204 of gas bearing spindle are in relative rotation.

As shown in FIG. 3B, grooves 214 and lands 310 of the grooved section are arranged in a double spiral pattern of chevron-shaped grooves in thrust surface 210. The double spiral pattern of chevron-shaped grooves originates at an inner diameter of the grooved section 306 and extends to the outer diameter of the grooved section 308. Such a double spiral pattern of chevron-shaped grooves 214 imparts a predetermined direction to the rotational motion of the shaft 202 within the sleeve 204. Each thrust surface (i.e., thrust surface 210 and thrust surface 210' of thrust plate 108 in FIG. 2) may have the same or a different groove pattern provided that the predetermined direction to the rotational motion of the shaft 202 within the sleeve 204 is maintained.

The grooved sections of each of FIG. 3A and FIG. 3B are examples and are not intended to limit the scope of the grooved sections or grooves thereof that may be used in the gas bearing spindles disclosed herein. As such, groove lengths, groove widths, groove depths, groove angles, and the number of grooves in a grooved section may vary, some of which may vary as a function of radius.

In some embodiments, for example, groove width may vary as a function of radius. In such embodiments, groove width may increase with an increase in radius (i.e., from an inner diameter to an outer diameter of the grooved section).

Groove pitch (i.e., distance from groove to groove) may vary in some embodiments as well, with groove pitch being about half the groove width.

In some embodiments, for example, groove depth may vary as a function of radius. In such embodiments, groove depth may increase with an increase in radius (i.e., from an inner diameter to an outer diameter), with groove depth being 1.5 to 2.0 times the width.

A gas bearing spindle comprising a thrust plate having one or more grooved thrust surfaces described herein (e.g., FIG. 3A and/or FIG. 3B) may utilize a pressurized gas selected from air, synthetic air, nitrogen, argon, and helium. Such a gas may be provided to the gas bearing spindle at a pressure of at least 5.0, 6.0, 7.0, 8.0, 9.0 or 10.0 bars, or more in some embodiments.

With respect to axial stiffness of the gas bearing spindle, in some embodiments, the axial stiffness may be at least 200, 250, 300, 350, 400, 450, or 500 N/μm, or more.

With respect to axial load capacity of the gas bearing spindle, in some embodiments, the axial load capacity may be at least 1000, 1250, 1500, 1750, or 2000 N, or more.

With respect to radial stiffness of the gas bearing spindle, in some embodiments, the radial stiffness may be at least 75, 100, 125, 150, 175, 200, or 225 N/μm, or more.

With respect to radial load capacity of the gas bearing spindle, in some embodiments, the radial load capacity may be at least 750, 1000, 1250, 1500, or 1750 N, or more.

With respect to axial error motion of the gas bearing spindle, in some embodiments, the axial error motion may be less than 25, 20, 15, 10, or 5 nm, or less.

With respect to radial error motion of the gas bearing spindle, in some embodiments, the radial error motion may be less than 25, 20, 15, 10, or 5 nm, or less.

With respect to maximum speed of rotation of the gas bearing spindle, in some embodiments, the maximum speed of rotation may be at least 10,000; 20,000; 30,000; 40,000; 50,000; 60,000; 70,000; 80,000; 90,000; or 100,000 rpm, or more.

Gas bearing spindles of the type described herein may be utilized for servo track writing on raw media for hard disk drives; however, such gas bearing spindles are not limited to servo track writing, as any application that utilizes a gas bearing spindle with a preferred rotational direction (e.g., clockwise or counterclockwise) may realize one or more benefits, as the disclosed gas bearing spindles may be made to rotate in either a clockwise or counterclockwise direction, increasing stiffness with rotational speed in either case.

With respect to servo track writing, a gas bearing spindle of the type described herein may be used to support a hub onto which raw media is mounted (e.g., see FIG. 2). A conventional gas bearing spindle and hub may hold 16-24 disks of raw media; however, the disclosed gas bearing spindle and a hub may hold at least 25, 26, 27, 28, 29, or 30 disks mounted thereon, or more than 30 disks. The increase in the number of disks that may be mounted onto a hub for servo track writing immediately increases the throughput of the process, even if servo track writing is performed at conventional speeds (e.g., speeds used with conventional gas bearing spindles).

Being that the stiffness of the disclosed gas bearing spindle increases with speed, throughput of the servo track-writing process may be further increased by increasing rotational speed over conventional rotational speed. Such increased stiffness of the disclosed gas bearing spindles with rotational speed is important for increasing throughput of the servo track-writing process because error motion takes a conical form (i.e., disks mounted further away from the spindle are affected to a higher degree) when using conventional gas bearing spindles, and increased rotational speed in conventional gas bearing spindles results in larger error motion.

Gas bearing spindles of the typed described herein actually gain stiffness with increased rotation speed. As such, gas bearing spindles of the type disclosed herein allow for increased servo track-writing throughput resulting from both an increase in the number of disks that may be mounted and written to and increased rotational speed. In addition, increased stiffness of gas bearing spindles of the type disclosed herein allow for increased precision in servo track-writing.

Thus, as provided herein, is an apparatus, comprising an inner component, wherein the inner component includes a thrust plate; an outer component, wherein the inner component and the outer component are positioned for relative rotation; a gas inlet operable to receive a pressurized gas; and a groove pattern in a first thrust surface of the thrust plate, wherein the groove pattern is operable to provide a first localized region of pressure about the first thrust surface of the thrust plate that has a greater pressure than the pressurized gas. In some embodiments, a first end of a first journal bearing is linked to the inner diameter of the thrust plate on the first thrust surface. In some embodiments, the apparatus further comprises a non-grooved section in the first thrust surface of the thrust plate, wherein the non-grooved section is operable to provide an aerostatic effect. In some embodiments, the apparatus further comprises a groove pattern in a second thrust surface of the thrust plate, wherein the groove pattern is operable to provide a second localized region of pressure about the second thrust surface of the thrust plate that has a greater pressure than the pressurized gas. In some embodiments, a first end of a second journal bearing is linked to the inner diameter of the thrust plate on the second thrust surface. In some embodiments, the apparatus further comprises a non-grooved section in the second thrust surface of the thrust plate, wherein the non-grooved section is operable to provide an aerostatic effect. In some embodiments, the groove pattern on the first thrust surface comprises a spiral groove pattern. In some embodiments, the groove pattern on the first thrust surface comprises a double spiral groove pattern comprising chevron-shaped grooves. In some embodiments, the groove pattern on the second thrust surface comprises a spiral groove pattern. In some embodiments, the groove pattern on the second thrust surface comprises a double spiral groove pattern comprising chevron-shaped grooves.

Also provided herein is an apparatus, comprising an inner component, wherein the inner component includes a thrust plate having a first thrust surface and a second thrust surface; an outer component, wherein the inner component and the outer component are positioned for relative rotation, and wherein the inner component and the outer component together provide a first journal bearing and a second journal bearing; and a gas inlet operable to receive a pressurized gas, wherein the first thrust surface is operable to provide a first localized region of pressure about the first thrust surface of the thrust plate that has a greater pressure than the pressurized gas, and wherein the second thrust surface is operable to provide a second localized region of pressure about the second thrust surface of the thrust plate that has a greater pressure than the pressurized gas. In some embodiments, the pressurized gas is selected from the group consisting of air, synthetic air, nitrogen, argon, and helium. In some embodiments, each of the first thrust surface and the second thrust surface comprises a groove pattern therein. In some embodiments, the groove pattern in the first thrust surface comprises a spiral groove pattern or a double spiral groove pattern comprising chevron-shaped grooves. In some embodiments, the groove pattern in the second thrust surface comprises a spiral groove pattern or a double spiral groove pattern comprising chevron-shaped grooves. In some embodiments, the groove pattern in each of the first thrust surface and the second thrust surface, in combination, impart a predetermined direction to the rotational motion of the inner component and the outer component.

Also provided herein is an apparatus, comprising an inner component, wherein the inner component includes a thrust plate; an outer component, wherein the inner component and the outer component are positioned for relative rotation, and wherein the inner component and the outer component are positioned to form at least one bearing having a groove pattern that imparts a predetermined direction to the rotational motion of the inner component and the outer component; and a gas inlet operable to receive a pressurized gas. In some embodiments, the at least one bearing comprises a thrust bearing having the groove pattern in a thrust surface of the thrust plate, and wherein the groove pattern is operable to provide a localized region of pressure about the thrust surface of the thrust plate that has a greater pressure than the pressurized gas. In some embodiments, the groove pattern comprises a spiral groove pattern or a double spiral groove pattern comprising chevron-shaped grooves. In some embodiments, the apparatus further comprises a journal bearing having a first end linked to an inner diameter of the thrust plate.

Also provided herein is an apparatus, comprising a gas bearing spindle, comprising an inner component, comprising a thrust plate having a first grooved thrust surface and a second grooved thrust surface, and an outer component, wherein the inner component and the outer component are positioned for relative rotation on a pressurized gas, and wherein the inner component and the outer component together provide a first journal bearing linked by a first end to the inner diameter of the thrust plate on the first grooved thrust surface and a second journal bearing linked by a first end to the inner diameter of the thrust plate on the second grooved thrust surface; and a gas inlet operable to receive a pressurized gas, wherein the first grooved thrust surface is operable to provide a first localized region of pressure about the first grooved thrust surface of the thrust plate that has a greater pressure than the pressurized gas, and wherein the second grooved thrust surface is operable to provide a second localized region of pressure about the second grooved thrust surface of the thrust plate that has a greater pressure than the pressurized gas. In some embodiments, the first grooved thrust surface and the second grooved thrust surface, in combination, impart a predetermined direction to the rotational motion of the inner component and the outer component of the gas bearing spindle. In some embodiments, increasing speed of the rotational motion in the predetermined direction results in increasing stiffness of the gas bearing spindle. In some embodiments, the gas bearing spindle further comprises a hub operable to mount a stack of at least 25 disks for servo track writing.

While the invention have been described and/or illustrated by means of various embodiments and/or examples, and while these embodiments and/or examples have been described in considerable detail, it is not the intention of the applicant(s) to restrict or in any way limit the scope of the invention to such embodiments and/or examples. Additional adaptations and/or modifications of the invention may readily appear to persons having ordinary skill in the art to which the invention pertains, and, in its broader aspects, the invention may encompass these adaptations and/or modifications. Accordingly, departures may be made from the foregoing embodiments and/or examples without departing from the scope of the invention, which scope is limited only by the following claims when appropriately construed.

What is claimed is:

1. An apparatus, comprising:
    an inner component,
        wherein the inner component includes a thrust plate having a first thrust surface and a second thrust surface;
    an outer component,
        wherein the inner component and the outer component are positioned for relative rotation, and
        wherein the inner component and the outer component together provide a first journal bearing, a second journal bearing, a thrust bearing, and a vent; and
    a gas inlet configured to direct a pressurized gas along the first journal bearing to the thrust bearing and from the thrust bearing to the vent,
        wherein the first thrust surface is configured to provide a first localized region of pressure about the first thrust surface of the thrust plate that has a greater pressure than the pressurized gas, and
        wherein the second thrust surface is configured to provide a second localized region of pressure about the second thrust surface of the thrust plate that has a greater pressure than the pressurized gas.

2. The apparatus of claim 1, wherein the pressurized gas is selected from the group consisting of air, synthetic air, nitrogen, argon, and helium.

3. The apparatus of claim 1, wherein each of the first thrust surface and the second thrust surface comprises a groove pattern therein.

4. The apparatus of claim 3, wherein the groove pattern in the first thrust surface comprises a spiral groove pattern.

5. The apparatus of claim 3, wherein the groove pattern in the second thrust surface comprises a spiral groove pattern.

6. The apparatus of claim 3, wherein the groove pattern in each of the first thrust surface and the second thrust surface, in combination, impart a predetermined direction to the rotational motion of the inner component and the outer component.

7. An apparatus, comprising:
- an inner component including a thrust plate;
- an outer component, wherein the inner component and the outer component are positioned for relative rotation, and define a thrust bearing, a journal bearing, and a vent;
- a groove pattern in the thrust bearing configured to impart a predetermined direction to the rotational motion of the inner component and the outer component; and
- a gas inlet configured to provide a pressurized gas from the journal bearing to the thrust bearing and from the thrust bearing to the vent.

8. The apparatus of claim 7, wherein the groove pattern is further configured to provide a localized region of pressure about a thrust surface of the thrust plate that has a greater pressure than the pressurized gas.

9. The apparatus of claim 8, wherein the groove pattern comprises a spiral groove pattern.

10. The apparatus of claim 8, wherein the journal bearing comprises a first end linked to an inner diameter of the thrust plate.

\* \* \* \* \*